Figure 1:
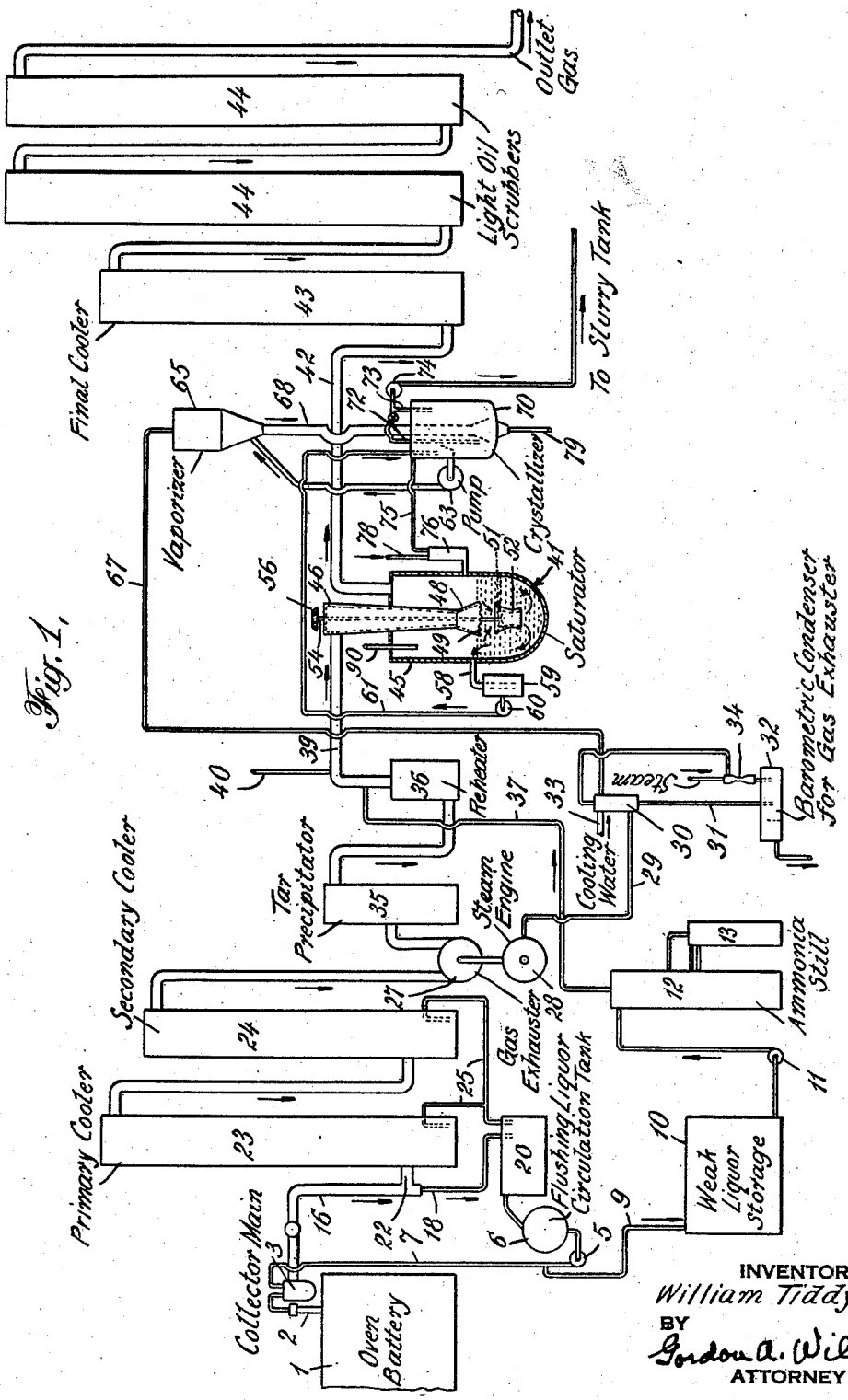

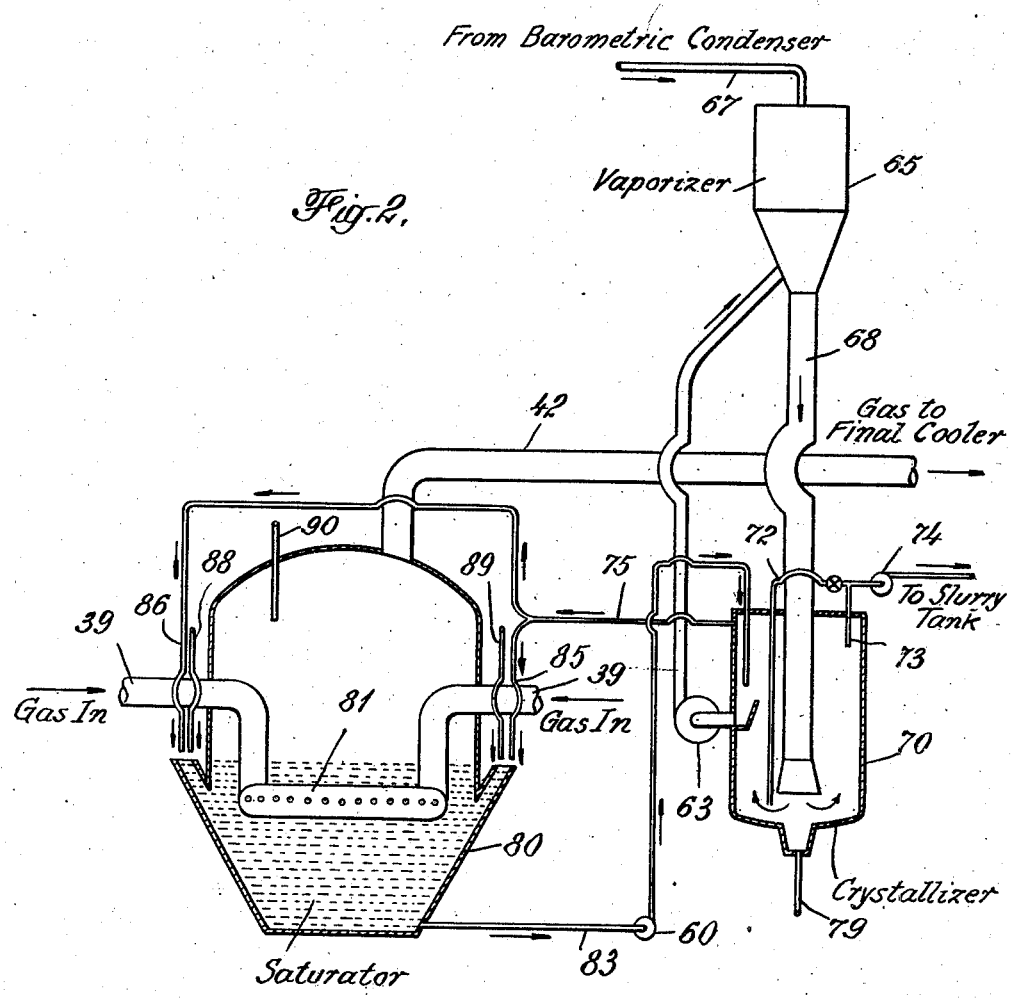

Patented Aug. 21, 1945

2,383,171

UNITED STATES PATENT OFFICE 2,383,171

AMMONIUM SALT PRODUCTION

William Tiddy, New York, N. Y., assignor to Semet-Solvay Engineering Corporation, New York, N. Y., a corporation of New York Application June 18, 1942, Serial No. 447,497

3 Claims. (Cl. 23—119)

This invention relates to the removal of ammonia from coke oven gas and more particularly to the recovery of ammonia as ammonium salts from gases produced in the carbonization of coal, especially coke oven gas.

The customary practice followed for many years in the recovery of ammonia from coke oven gas has involved drawing the gas by means of an exhauster through one or more packed cooling columns, and forcing the gas by the exhauster through a saturator containing a deep body of aqueous sulfuric acid saturated with ammonium sulfate whereby the ammonia present in the gas reacts with the acid to form ammonium sulfate which immediately separates from the solution in the form of small crystals containing a large proportion of fines of almost powdery character; the ammonium sulfate is removed from the saturator and dried, e. g., by centrifuging. This process is subject to the disadvantage that owing to the small size and non-uniform character of the ammonium sulfate crystals they show a marked tendency to cake when stored.

My co-pending application Serial No. 358,233, filed September 25, 1940, discloses a radically different, commercially successfully process for the recovery of ammonium sulfate from coke oven gas as relatively large uniform crystals by intimately contacting coke oven gas of controlled temperature and humidity with an unsaturated ammonium sulfate solution containing free sulfuric acid in a scrubbing column to form additional ammonium sulfate by reaction of the ammonia present in the gas with the free sulfuric acid, supersaturating the resultant solution by evaporative cooling and concentration under vacuum, passing the supersaturated solution into contact with previously formed ammonium sulfate crystals whereby the crystals grow until they reach the desired size, and recirculating the solution with additional sulfuric acid through the scrubbing column. In order to practice this process in existing coke oven plants equipped with saturator-type apparatus, it is necessary to replace the saturators with scrubbing columns and crystallizing apparatus. The present invention is in the nature of an improvement on the invention of application Serial No. 358,233, which improvement permits utilization of existing saturator-type equipment in the production of large uniform crystals of ammonium salts such as ammonium sulfate from coke oven gas.

It is an object of this invention to provide a novel combination of saturator and crystallizing equipment for the recovery of ammonia as ammonium salt crystals of relatively large uniform size from ammonia-containing gas produced in the carbonization of coal.

It is another object of the invention to provide a process of producing relatively large crystals of ammonium salts, particularly ammonium sulfate from coke oven gas, which process may be carried out with only minor modification of existing equipment. Other objects and advantages will appear hereinafter.

In accordance with the invention, I provide apparatus involving the combination of a saturator-type chamber, which may be of conventional type, comprising a gas inlet extending into a body of aqueous solution of a mineral acid and ammonium salt of the acid, a vacuum chamber for cooling and supersaturating under vacuum the salt solution from the saturator, a crystallizing chamber in which the supersaturated solution is passed into contact with previously formed crystals of the salt causing them to grow until they reach the desired size, and means for recirculating salt solution from the saturator to the vacuum chamber, thence to the crystallizing chamber and from the crystallizing chamber back to the saturator. The invention may be utilized in connection with conventional coke oven apparatus involving an exhausting pump driven by a condensing steam engine and exhaust steam from the engine may be condensed in a barometric condenser, together with the vapors from the vacuum chamber.

In carrying out the process of the invention, coke oven gas containing ammonia preheated to a temperature of from 30° to 60° C. and at a regulated humidity within the range of 70 to 100 per cent is passed into a saturator beneath the surface of a body of aqueous solution of a mineral acid, preferably sulfuric acid, containing an ammonium salt of the acid in amount insufficient to saturate the solution so that the ammonia in the gas reacts with the free acid and forms additional salt, while maintaining sufficient circulation within the saturator to prevent excess local supersaturation with consequent crystal formation in the solution therein. The resultant solution of ammonium salt of a concentration about or somewhat below saturation is withdrawn from the saturator, evaporatively cooled and concentrated under vacuum in the vacuum chamber to a condition of metastable supersaturation with respect to the salt and is then passed into contact with a bed or suspension of crystals of the salt, whereby salt crystallizes from the solution on the surfaces of the crystals so that large crystals are formed. The crystals settle to the bottom of the suspension when they reach the desired size and may be removed continuously or from time to time. The solution, together with additional water and free acid is then recirculated back to the saturator for the absorption of additional ammonia and the formation of additional salt. Instead of sulfuric acid, other mineral acids such as nitric, phosphoric and hydrochloric acids may be employed.

The temperature and humidity of the coke oven gas entering the saturator, the rate of introduction of water and the rate of circulation of solution from the saturator to the crystallizing apparatus back to the saturator are correlated to evaporate approximately sufficient water in the saturator to maintain the volume and temperature of the solution therein substantially constant and to provide a concentration of ammonium salt in the solution withdrawn from the saturator at or somewhat below that required for saturation of the solution and below that at which substantial crystal formation would occur. The free acid content of the saturator solution is preferably maintained relatively low, i. e., within the range of from 1 to 5 per cent by weight based on the aqueous content of the solution. Employing sulfuric acid as the mineral acid, the free acid content is preferably maintained at 3 per cent by weight based on the aqueous content of the solution and the temperature of the solution is maintained within the range of from 45° to 55° C.

It will be observed that the principles of operation of the present invention are in direct contrast to the prior art saturator processes for the production of ammonium sulfate crystals. In such prior art processes, the salt crystals are formed directly in and removed as such from the saturator. In the present invention the conditions in the saturator are regulated to form a salt solution of controlled concentration without formation of crystals in the saturator, the solution is withdrawn from the saturator and is then cooled and supersaturated under vacuum and the supersaturated solution is passed into contact with crystals of the salt.

For a more complete understanding of the invention, reference may be had to the accompanying drawings illustrating for exemplary purposes preferred embodiments of the invention.

In the drawings,

Figure 1 is a view showing somewhat diagrammatically one form of apparatus for carrying out the invention associated with conventional coke oven gas equipment, and Figure 2 is a partial sectional view on a somewhat larger scale illustrating another embodiment of the invention.

Referring to Figure 1 of the drawings, reference numeral 1 designates generally any well known type of by-product coke oven battery which may be of the horizontal type having uptake pipes 2 through which gas flows from the individual coking chambers to collector main 3 equipped with a plurality of sprays (not shown) supplied with ammonia liquor pumped by pump 5 from tank 6 through conduit 7. A portion of the weak liquor flows from the pump 5 through conduit 9 to storage tank 10 from which it may be pumped by pump 11 to ammonia still 12 equipped with a fixed lime leg 13 for freeing the ammonia from the liquor in a manner well known in the art.

The weak ammonia liquor collecting in the collector main 3 flows through pipes 16 and 18 to decanter 20 in which tar is separated from the liquor and from which the liquor flows to tank 6. Coke oven gas likewise flows through pipe 16 and leaves the latter through offtake pipe 22 which leads to primary cooler 23 and a secondary cooler 24 filled with any suitable packing material which causes intermixture of the gas with cooling liquor sprayed into the tops of the coolers in a manner well known in the coke oven art. Cooling liquor flows from the bottom of the coolers through conduits 25 to the decanter 20. The coke oven gas is drawn through the collector main and coolers by an exhauster pump 27 driven in the customary manner by a condensing steam engine 28, discharging exhaust steam through conduit 29 to barometric condenser 30. The barometric condenser is of the conventional type equipped with the usual barometric leg 31, a seal 32, a water inlet 33 supplying cooling water to the water jets of the condenser and suction device 34 for removing non-condensables from the condenser. Condensation of the steam by the cooling water in the condenser produces a vacuum therein. If desired, an engine of lower horse power (than would normally be used in the installations involving customary saturators) operating at full capacity may be employed to drive the exhauster.

From the exhauster pump 27, the coke oven gas flows through a tar precipitator 35 which may be of the electrical type to reheater 36 where it is reheated, e. g., to a temperature between about 40° to 48° C. Ammonia and steam from the ammonia still 12 may be introduced into the coke oven gas through conduit 37 communicating with conduit 38 to augment the ammonia content and humidity of the gas and additional steam may be introduced into the coke oven gas through conduit 40, the total amount of steam introduced with the ammonia and through the conduit 40 being regulated to bring the humidity of the gas to from 70 to 100 per cent. From conduit 38 the coke oven gas passes through a saturator-type absorption apparatus designated as a whole by reference numeral 41 and the ammonia-free gas is conducted thence through conduit 42, final cooler 43 and light oil scrubbers 44 where it is cooled and scrubbed.

The saturator involves a lead lined reaction chamber 45 equipped with a coke oven gas inlet or "cracker" pipe 46 extending downwardly through the top thereof and having a flared lower end 48 provided with a fluted lower edge 49 extending somewhat, e. g., from 10 to 20 inches, below the level of the solution in chamber 45. In order to prevent local supersaturation which would result in crystal formation in the chamber 45, the saturator may be provided with an impeller type agitator 51 located within tubular member 52 situated beneath the coke oven gas inlet; the agitator is mounted on shaft 54 extending vertically through the gas inlet and driven by gearing diagrammatically designated at 56 from any suitable source of power (not shown).

The saturator chamber is provided with overflow outlet conduit 58 located at the surface of the solution therein, which conduit discharges through liquid seal 59 to pump 60 which circulates the solution through conduit 61 to the inlet of pump 63 discharging into vaporizer or vacuum chamber 65. Vacuum chamber 65 communicates through conduit 67 with barometric condenser 30 which, as hereinabove described, is supplied with steam from steam engine 28; the barometric condenser serves to condense the exhaust steam from steam engine 28 as well as the vapors from vacuum chamber 65, thus maintaining vacuum on the steam engine exhaust conduit 29 and the vacuum chamber. In vacuum chamber 65, the solution from saturator 41 is cooled and concentrated under vacuum to a condition of metastable supersaturation with respect to the salt and then passes downwardly through pipe 68 to the lower portion of crystallizing chamber 70 containing a suspension or bed of crystals of the salt and thence upwardly over these crystals, whereby the solution deposits the salt of supersaturation on the surfaces of the crystals causing them to increase in size. Crystals mixed with any desired portion of liquor may be removed from the crystallizing chamber continuously or from time to time through pipes 72, 73 and pump 74 to a slurry tank (not shown) from which they may be fed to a centrifuge for separating the crystals from the liquor. The solution is recirculated from the upper portion of the crystallizing chamber through overflow conduit 75 through liquid seal 76 back to the saturator, free acid, water and liquor separated from the crystals in the centrifuge being added through conduit 78. The crystallizing chamber may be drained when desired through outlet 79.

Figure 2 illustrates a modification of the apparatus involving a saturator 80 equipped with a coke oven gas inlet 81 in the form of a perforated ring. In this figure, the crystallizing apparatus and other parts identical with those shown in Figure 1 are designated by the reference numerals employed in Figure 1. Circulation of the solution within the saturator is obtained by pumping solution from near the bottom of the saturator to the crystallizing apparatus through conduit 83 by pump 60 and recirculating the solution from the crystallizing chamber through conduits 85 and 86 through fluid seals (not shown) to the upper portion of the body of solution in the saturator. In this manner sufficient circulation of the saturator solution is effected to prevent excess local supersaturation and crystal formation in the saturator without employing an internal agitator. Make-up acid, water and liquor separated from the crystals in the centrifuge may be introduced into the saturator of Figure 2 through conduits 88 and 89.

In carrying out the invention for the production of ammonium sulfate, for example, coke oven gas from collector main 3, coolers 23 and 24 and tar precipitator 35 is preheated in preheater 36, mixed with ammonia and steam from still 12 and, if necessary, sufficient additional steam is introduced through conduit 40 to raise the humidity of the gas to about 98 per cent. The gas at a temperature of about from 45° to 48° C. is then introduced through the coke oven gas inlet beneath the surface of the saturator solution containing about from 40 to 45 per cent by weight of ammonium sulfate and from 20 to 50 grams of free sulfuric acid per liter at a temperature of from 45° to 55° C. The ammonia present in the gas reacts with the sulfuric acid in the solution to form additional ammonium sulfate which increases the ammonium sulfate concentration of the solution but not sufficiently to promote crystal formation in the saturator. Sufficient circulation within the crystallizing chamber to prevent excess local supersaturation and crystal formation is effected by impeller 51 in Figure 1 and by withdrawing the solution from the lower end and returning it in the upper portion of the saturator in Figure 2. Ammonium sulfate solution containing from 41 to 46 per cent by weight of ammonium sulfate and from 10 to 40 grams of free sulfuric acid per liter is circulated by pump 60 to the inlet of pump 63 which in turn discharges the solution into vacuum chamber or vaporizer 65. Cooling of the solution in the conduits prior to reaching the vacuum chamber sufficiently to promote crystal formation in the conduits should be avoided. If desired, these conduits may be insulated or steam-jacketed to prevent excess cooling.

The solution is cooled and concentrated under vacuum to a state of metastable supersaturation and then passes through pipe 68 to the lower portion of crystallizing chamber 70 into contact with the bed or suspension of crystals in the chamber and ammonium sulfate from the solution deposits on the surfaces of the crystals causing them to grow, the larger crystals being removed through pipe 72 extending into the lower portion of the crystallizing chamber together with any desired proportion of liquor through pipe 73. Ammonium sulfate liquor at a temperature of about 43° to 53° C. and containing from about 43 to 46 per cent by weight of ammonium sulfate and from about 10 to 50 grams of sulfuric acid per liter passes from the crystallizing chamber through overflow conduit 75 back to the upper portion of the saturator. Fresh acid, water and liquor separated from the crystals removed from the crystallizing chamber are introduced into the saturator through conduit 78 or conduits 88, 89, the rates of introduction of the acid and water and the humidity of the coke oven gas being correlated to maintain the volume, acid and salt concentrations and the temperature of the solution in the saturator substantially constant. The acid introduced near the upper surface of the solution in the saturator forms an acid seal through which the coke oven gas bubbles upwardly so as to accomplish substantially complete removal of the ammonia from the gas.

Coke oven gas free from ammonia escapes from the top of the saturator through pipe 42 and passes through final cooler 43 and light oil scrubbers 44. In commencing operation, it is not necessary to begin with a solution of the ammonium salt in the saturator as absorption of ammonia in a solution of sulfuric or other mineral acid will in due course result in a salt solution of the desired concentration.

In some cases incrustations of ammonium sulfate or other salt may tend to form on the walls of the saturator above the surface of the solution. Such incrustations may be prevented or minimized by introducing exhaust steam through steam inlet 90 into the chamber above the solution to increase the humidity of the gas leaving the saturator. If for any reason salt crystals or incrustations form in the saturator solution, they may be removed by raising the humidity of the coke oven gas to about 100 per cent to minimize evaporation of water and increasing the rate of introduction of water sufficiently to dissolve the incrustations. After the incrustations have been dissolved, operation as hereinabove described may be resumed.

In accordance with the invention, ammonium sulfate crystals of improved uniformity and size as compared with those obtainable by the customary saturator process are produced. The crystals have the desirable characteristic that they are less needle-like, i. e., that they are of greater thickness in proportion to their length than crystals produced by certain saturator processes heretofore known. Since the coke oven gas inlet extends only from 10 to 20 inches below the surface of the solution in the saturator as compared with from about 35 inches in the usual saturator process, less pressure is required to force the coke oven gas through the apparatus in accordance with the invention, than is necessary in the usual saturator operations. The power thus saved may be utilized to produce the vacuum employed in supersaturating the solution with little or no increase in power costs. Furthermore, existing coke oven plants may be equipped to carry out the invention without discarding the saturator chambers now employed in such plants.

Since certain changes may be made without departing from the scope of the invention, it is intended that the above should be interpreted as illustrative and not in a limiting sense. For example, while the invention is primarily intended for the production of ammonium salts from coke oven gas, it may be employed in the manufacture of such salts from other ammonia containing gases produced in the carbonization of coal, e. g., gases produced by the carbonization of coal in gas making retorts and producer gas produced from bituminous coal.

I claim:

1. A process for the recovery of ammonia from ammonia-containing gas produced during the coking of coal as relatively large crystals of an ammonium salt of a mineral acid, which comprises heating said gas containing ammonia to a temperature within the range of 30° to 60° C., adding sufficient moisture to the gas to raise its humidity to at least 70%, passing the humidified gas at a temperature within the range of 30° to 60° C. beneath the surface of a body of solution in a saturator containing free mineral acid and an insufficient amount of ammonium salt of said acid to saturate said solution, whereby ammonia present in the gas reacts with the acid to form additional salt, withdrawing solution of said salt from said saturator, cooling and concentrating the withdrawn solution to a condition of metastable supersaturation by evaporation under vacuum, passing the supersaturated solution into contact with a suspension of crystals of said ammonium salt, whereby said salt deposits from the solution on the surfaces of said crystals causing them to increase in size, recirculating the solution to said saturator, adding water and free mineral acid to said saturator, correlating the rates of addition of water and acid and of recirculation of the solution to the saturator and the humidity of the coke oven gas to prevent the ammonium salt concentration of the solution in the saturator from rising above saturation, and effecting circulation of the solution within the saturator to prevent local supersaturation and crystal growth within the saturator.

2. A process for the recovery of ammonia from coke oven gas as relatively large crystals of ammonium sulfate which comprises heating coke oven gas containing ammonia to raise its temperature to from 30° to 60° C., adding sufficient moisture to the gas to raise its humidity to at least 70 per cent, passing the humidified gas at a temperature of from 30° to 60° C. beneath the surface of a body of solution in a saturator containing an insufficient amount of ammonium sulfate to saturate the solution and sufficient free sulfuric acid to absorb ammonia from said gas whereby the ammonia present in the gas reacts with the acid to form additional salt, continuously withdrawing solution from said saturator, cooling and concentrating the withdrawn solution to a condition of metastable supersaturation by evaporation under vacuum, passing the supersaturated solution into contact with a suspension of crystals of ammonium sulfate whereby ammonium sulfate deposits from the solution on the surface of said crystals causing them to increase in size, recirculating the solution back to said saturator, adding water and free sulfuric acid to said saturator, correlating the rates of addition of water and acid and the humidity of the coke oven gas to maintain a substantially constant temperature of from 45° to 55° C. and a substantially constant volume of solution in said saturator and to prevent the ammonium sulfate concentration of the solution in the saturator from rising above saturation, and effecting circulation of the solution within the saturator to prevent substantial local supersaturation and crystal growth within the saturator.

3. A process for the recovery of ammonia as relatively large crystals of ammonium sulfate which comprises passing preheated ammonia-containing coke oven gas at a regulated humidity of at least 70 per cent and a temperature of from 30° C. to 60° C. beneath the surface of a body of solution in a saturator containing insufficient ammonium sulfate to saturate the solution and free sulfuric acid whereby the ammonia present in the gas reacts with the sulfuric acid to form additional ammonium sulfate, withdrawing ammonium sulfate solution containing from 41 to 46 per cent by weight of ammonium sulfate and from 10 to 40 grams per liter of free sulfuric acid from said saturator, cooling and concentrating the withdrawn solution to a condition of metastable supersaturation with respect to ammonium sulfate by evaporation under vacuum, passing the metastable supersaturated solution upwardly through a suspension of crystals of ammonium sulfate whereby ammonium sulfate deposits from said solution on the surfaces of said crystals causing them to increase in size, recirculating the solution containing from 43 to 46 per cent by weight of ammonium sulfate and from 10 to 40 grams per liter of sulfuric acid at a temperature of 43° to 53° C. back to said saturator, adding sufficient free sulfuric acid to said saturator to maintain the free acid concentration therein at from 20 to 50 grams per liter, adding water to said saturator and correlating the humidity of said coke oven gas and the rate of addition of water to maintain a substantially constant volume of said solution in said saturator at a temperature within the range of from 45° to 55° C., and to maintain the average ammonium sulfate concentration in the saturator below the saturation point and effecting circulation of the solution in the saturator to substantially prevent excessive local supersaturation and formation of crystals in the body of solution in the saturator.

WILLIAM TIDDY.